United States Patent [19]

Hansen

[11] Patent Number: 4,501,981
[45] Date of Patent: Feb. 26, 1985

[54] RETURN-TO-ZERO STEPPER MOTOR

[75] Inventor: Charles W. Hansen, Wolcott, Conn.

[73] Assignee: Haydon Switch & Instrument, Inc., Waterbury, Conn.

[21] Appl. No.: 311,754

[22] Filed: Oct. 15, 1981

[51] Int. Cl.³ .............................................. H02K 37/00
[52] U.S. Cl. .................... 310/49 R; 310/80; 310/209
[58] Field of Search .............. 310/49 R, 79, 80, 194, 310/190, 191, 209, 156, 162, 163, 164, 90, 12, 13, 15, 20

[56] References Cited

U.S. PATENT DOCUMENTS

| | | | |
|---|---|---|---|
| 1,131,551 | 3/1915 | Price | 310/209 |
| 2,810,085 | 10/1957 | Akeley | 310/162 |
| 2,981,855 | 4/1961 | Lieshout et al. | 310/163 |
| 3,119,941 | 1/1964 | Guiot | 310/49 A |
| 3,204,137 | 8/1965 | Gardes | 310/164 |
| 3,264,502 | 8/1966 | Lytle | 310/49 R |
| 3,508,091 | 4/1970 | Kavanaugh | 310/49 R |
| 3,549,918 | 12/1970 | Spivak | 310/68 R |
| 3,633,055 | 1/1972 | Hoffmeyer | 310/180 |
| 3,693,034 | 9/1972 | Inariba | 310/49 R |
| 3,824,420 | 7/1974 | Stegeman | 310/80 |
| 3,904,902 | 9/1975 | Inariba | 310/162 |
| 4,034,247 | 7/1977 | Wagensonner et al. | 310/164 |
| 4,237,838 | 12/1980 | Kinugawa | 123/339 |
| 4,333,026 | 6/1982 | Bock | 310/49 R |
| 4,378,767 | 4/1983 | Kobashi | 310/49 R |
| 4,381,747 | 5/1983 | Kobayashi | 310/80 |

FOREIGN PATENT DOCUMENTS

| | | | |
|---|---|---|---|
| 53883 | 6/1982 | European Pat. Off. | 310/80 |
| 1814262 | 6/1970 | Fed. Rep. of Germany | 310/80 |
| 972415 | 10/1964 | United Kingdom | 310/80 |

Primary Examiner—R. Skudy
Attorney, Agent, or Firm—Lee C. Robinson, Jr.

[57] ABSTRACT

A linear stepper motor is provided with a feature to cause it to return to a zero position when current is cut off. The motor is formed of a stator armature assembly and a permanent magnet rotor assembly with poles thereof facing poles of the stator armature. The rotor assembly includes a rotor core formed as a nut with an axial threaded aperture extending therethrough. A shaft assembly includes a shaft screw mating with the rotor core nut, a front shaft affixed thereto, and a fixed sleeve overfitting the front shaft to permit axial motion thereof. A ball-and-groove arrangement in the front shaft and the sleeve prevents rotation of the shaft without impairing axial movement thereof. A spring causes return of the shaft to zero when there is no current applied to the stator armature. The spring can, for example, be a coil compression spring overfitting a portion of the shaft or a spiral torsion spring extending between the rotor and the stator armature.

25 Claims, 7 Drawing Figures

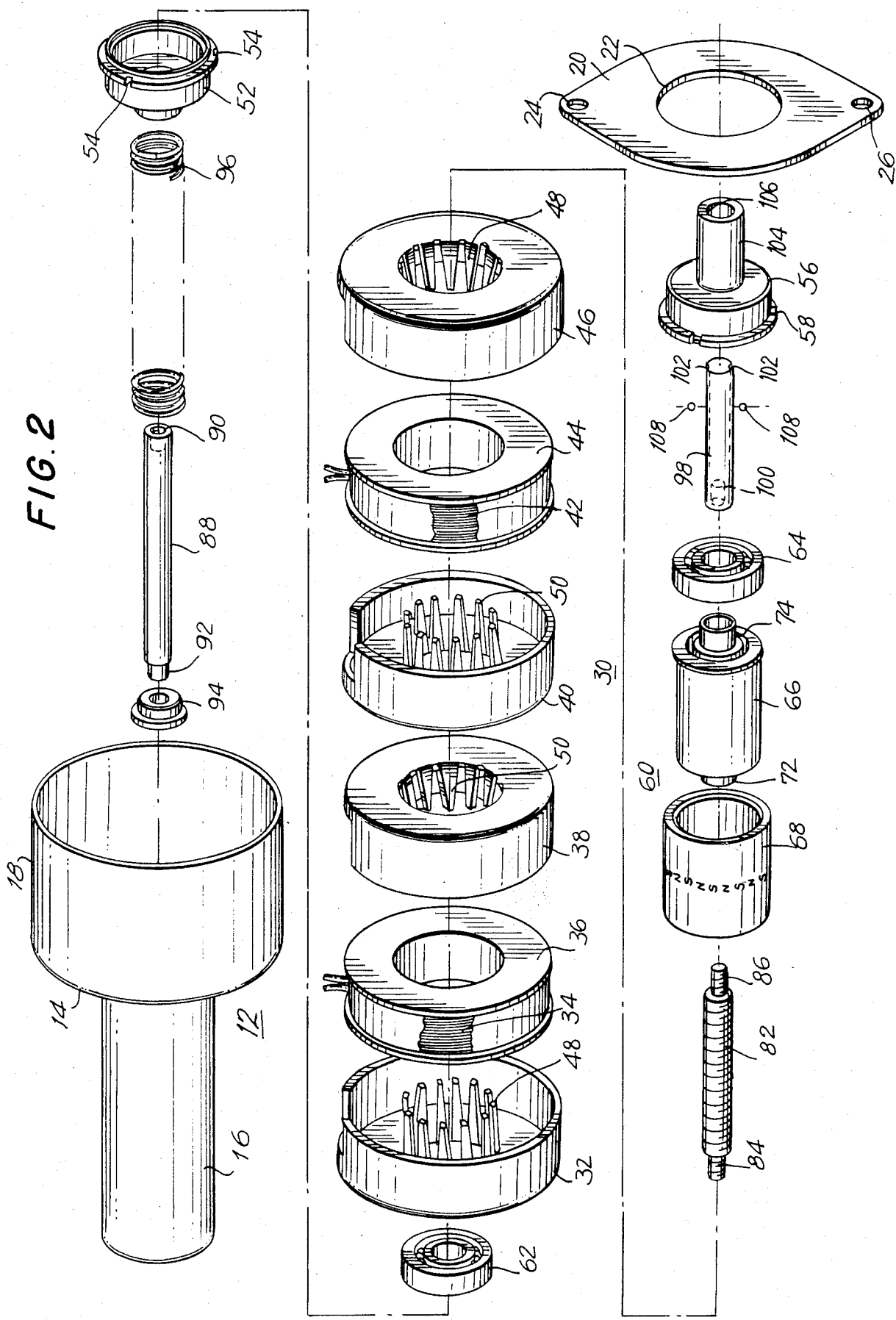

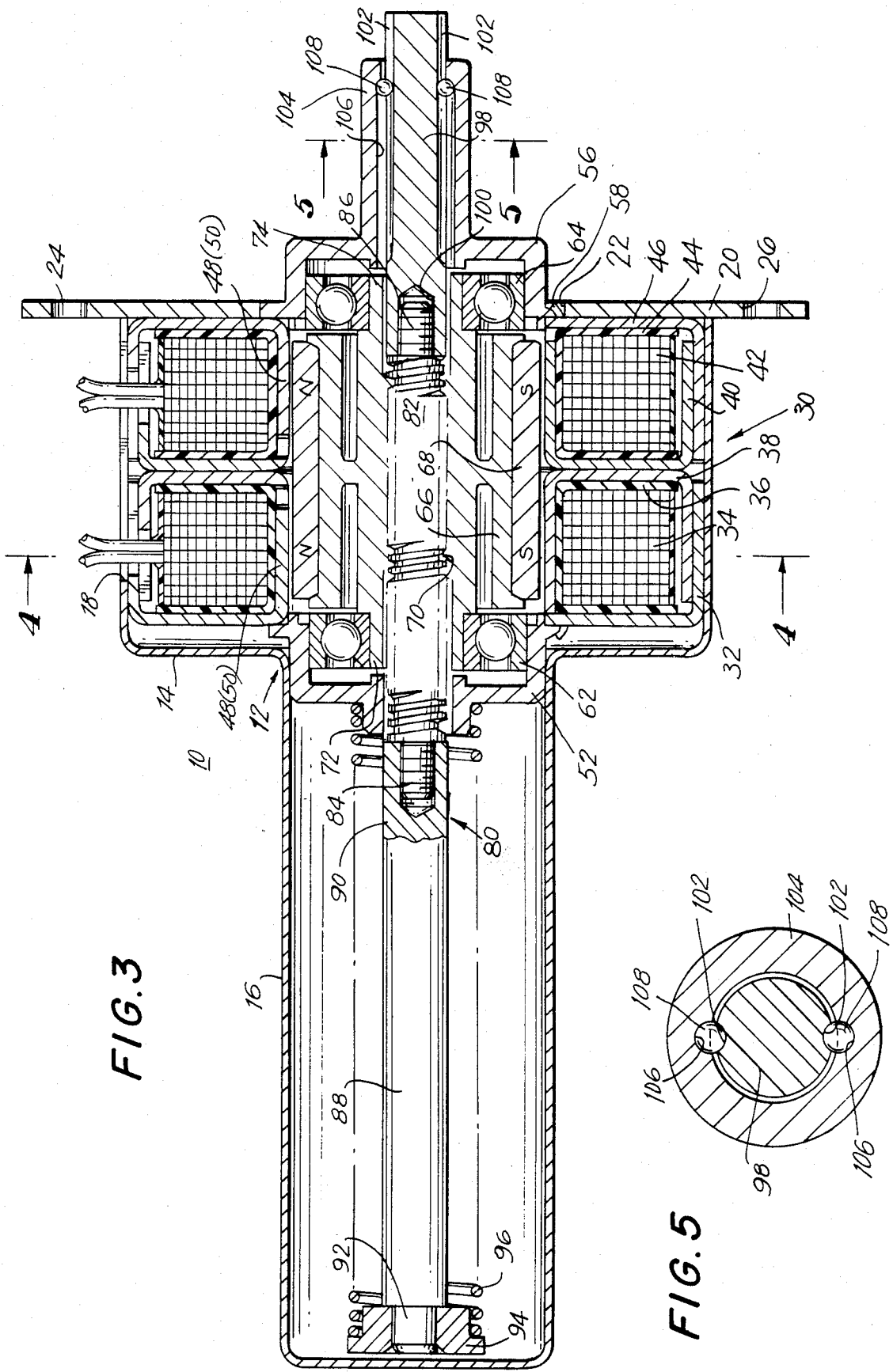

RETURN-TO-ZERO STEPPER MOTOR

BACKGROUND OF THE INVENTION

1. Field of the Invention

The present invention is directed to electric machines, and more particularly to stepper motors. Favorable embodiments of this invention are related to stepper motors which can be linearly advanced or retracted by application of stepper current, and which will automatically return to a zero position when current is cut off.

2. History of the Prior Art

There have been developed a number of electric rotating machines which can serve as stepper motors. Representative motors of this type are disclosed for example in U.S. Pat. Nos. 3,549,918 to Croymans et al., 3,633,055 to Ivan W. Maier, and 3,508,091 to R. J. Kavanaugh. The construction of these motors is quite similar to that of synchronous motors and, to an extent, the two types of motors are more or less interchangeable. Typically, these stepper motors include one or more coaxial stacked stator magnets with a cavity extending along a central axis, and a permanent magnet rotor disposed in the cavity. The stator magnets each include a toroidal winding and a stator yoke or case with axial teeth pointing in alternate directions to serve as salient stator poles. The teeth of each stator magnet are offset from the teeth of the other stator magnets to give the stepper motor the capability of being stepped in either rotational direction, i.e., clockwise or counterclockwise.

While these stepper motors act satisfactorily for imparting controlled rotational motion, they have not been adaptable to use as linear stepper motors to impart a controlled linear displacement.

Recently it has been desired to use electronic and electromechanical mechanisms for the automation of various functions formerly performed by purely mechanical means. For example, in the automotive industry, it has been desired to use an electronic system to control carburetor valves and fuel injection pumps. This would enable the fuel flow and other engine operating characteristics to be controlled under the command of a microprocessor and based upon various parameters such as engine speed, engine load, degree of accelerator actuation, etc. Thus, an electronic system can thereby achieve optimum engine performance at peak efficiency. A stepper motor could then be incorporated in the system to translate electrical information (in the form of pulses) into mechanical motion to control the carburetor or fuel injection system.

Unfortunately, no appropriate stepper motor has previously been available. In order to operate in the environment of an automotive internal combustion engine, not only must the motor enjoy long life in an atmosphere containing lubricants and fuel (gasoline or diesel fuel) at temperatures ranging from $-40°$ C. to $+85°$ C., it must also reliably deliver certain performance characteristics. In order to actuate the carburetor or fuel injector properly, the stepper motor must move in 0.002 to 0.004 inch steps and provide a linear thrust of about ten pounds. The motor must respond to each pulse and operate at a speed of up to 200 pulses per second. In addition, in the case of power loss (or switch-off of ignition) the linear stepper motor must retract to a withdrawn, or zero start position. Furthermore, the motors must be of a rather straightforward design so that the production costs thereof are kept reasonably low.

OBJECTS AND SUMMARY OF THE INVENTION

One general object of this invention, therefore, is to provide a new and improved linear stepper motor which returns to a start position when no current is applied to it.

It is a more specific object of this invention to provide a linear stepper motor having the above-mentioned desirable characteristics while avoiding the shortcomings of conventional stepper motors.

It is another object of this invention to provide a linear stepper motor suitable for use with a carburetor or fuel injector of an internal combustion engine.

It is a related object to provide a linear stepper motor which can be stepped forward or backward, as desired, and which will provide sufficient thrust to operate a carburetor or fuel injector.

According to one illustrative embodiment of this invention, the stepper motor includes a stator assembly having first and second toroidal stator electromagnets each having a plurality $2n$ of evenly-spaced axial teeth forming alternating salient stator pole pieces surrounding a stator cavity. The pole pieces of the first and second electromagnets are offset from one another by an electrical angle of $90°$. A permanent-magnet cylindrical rotor magnet having a plurality $n$ of pairs of poles is arranged in the cavity to face the pole pieces. A rotor core, on which the rotor magnet is disposed, is mounted on bearings for rotation relative to the stator assembly. This core has a central axial aperture extending therethrough provided with female helical threads.

A linear shaft assembly includes a screw having male helical threads to mate with the threads in the rotor core. The shaft assembly also includes a front shaft and a rear shaft coaxial with, and affixed to respective ends of, the screw. A front sleeve is affixed relative to the stator assembly and radially surrounds the front shaft to permit free axial movement thereof, but also includes structure, favorably a ball-and-groove arrangement, to restrict or prevent rotation of the front shaft.

A rear sleeve is mounted affixed to the stator assembly, and has a bore to permit free axial movement of the rear shaft. A compression helical spring is disposed over the rear shaft and is held against the rear sleeve by a button, or bushing affixed to the end of the rear shaft.

The threads of the core and of the screw have a pitch low enough to permit rotation of the rotor assembly to advance the shaft assembly when stepping current is applied to the stator, but high enough to permit the force of the compression spring to return the shaft assembly to its zero, or neutral position when no current is applied.

In several possible alternative embodiments, a torsional spring, such as a clock spring, can be disposed to provide a torsional spring force between the rotor assembly and the stator assembly and return the rotor to its zero position whenever no current is applied.

The present invention, as well as further objects, features, and advantages thereof, will be understood more clearly and fully from the ensuing description of preferred embodiments, when read in conjunction with the accompanying drawings.

BRIEF DESCRIPTION OF THE DRAWINGS

FIG. 2 is an exploded view showing the parts of the embodiment of FIG. 1.

FIG. 3 is a longitudinal sectional view taken along the line 3—3 of FIG. 1.

FIG. 5 is a cross-sectional view taken along the line 5—5 of FIG. 3.

DETAILED DESCRIPTION OF PREFERRED EMBODIMENTS OF THE INVENTION

Figure 4:
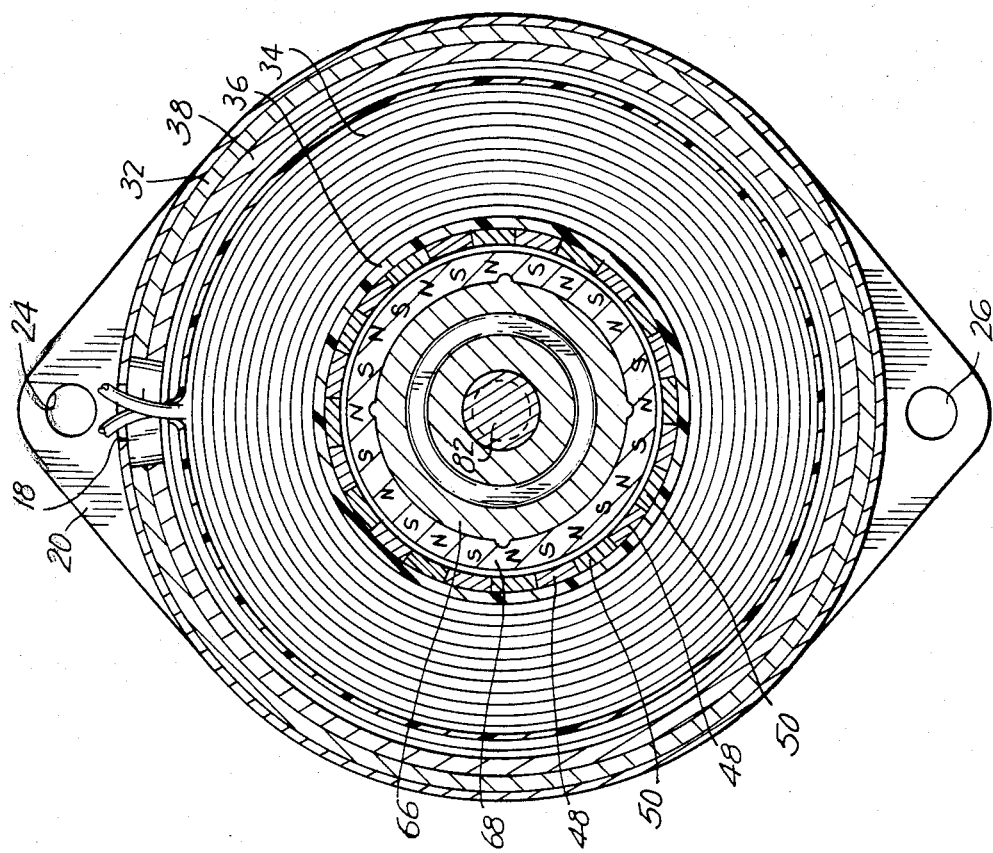
FIG. 4 is a cross-sectional view taken along the line 4—4 of FIG. 3.
Figure 1:
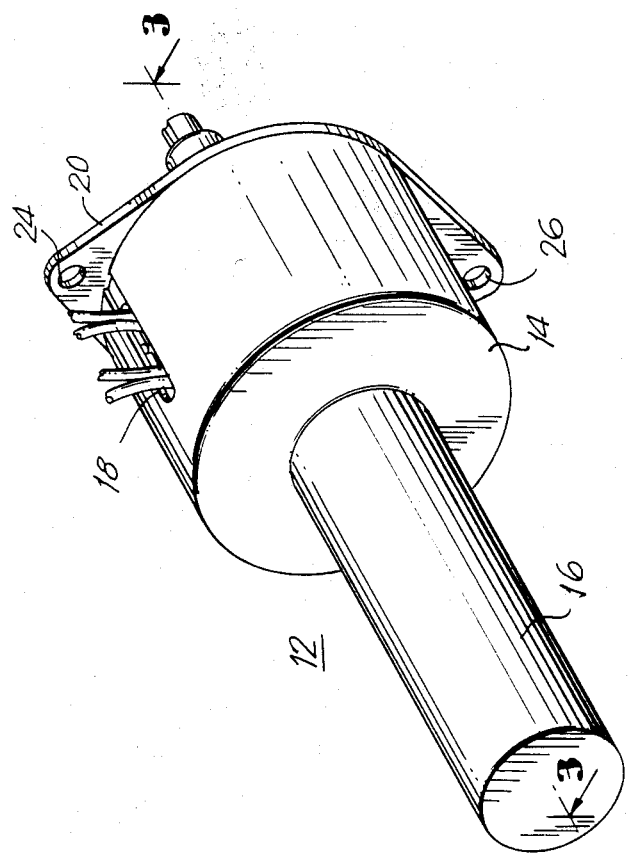
FIG. 1 is a perspective view of one embodiment of a return-to-zero stepper motor according to this invention.

Referring initially to FIGS. 1 and 2, an electric stepper motor 10 according to this invention includes a housing 12 preferably drawn as a cup of aluminum alloy. The housing 12 includes a stator housing cup 14 and an axial protuberance 16 enclosing a rear shaft of the motor, to be described later. An access slot 18 is provided on the stator housing cup 14 through which stator leads extend.

A mounting plate 20 is disposed at the end of the housing 12 remote from the protuberance 16 and includes a central aperture 22 and a pair of mounting holes 24, 26 to receive screws or bolts for mounting the stepper motor, for example, against a carburetor or fuel injector control valve of an internal combustion engine.

A stator assembly 30 of the linear stepper motor, as best viewed in FIGS. 2 and 3, includes a rear field armature formed of an outer field ring 32, a rear field coil 34 toroidally wound upon a bobbin 36, and an inner field ring 38. The stator assembly 30 further includes a front field armature formed of an inner field ring 40, a front field coil 42 toroidally wound upon a bobbin 44, and an outer field ring 46. Each of the outer field rings 32 and 46 are provided with twelve regularly-spaced axial teeth forming salient pole pieces 48 for the respective stator armatures. Similarly, the inner field rings 38 and 40 are provided with twelve regularly-spaced axial teeth to form opposite salient pole pieces 50. When assembled, the teeth or pole pieces 50 are each spaced midway between successive teeth or pole pieces 48 within the respective front and rear field armatures.

The outer field rings 32 and 46 are also each constructed with an axial annular wall and an upstanding circumferential wall. The outer field rings 32 and 48 are dimensioned so that the interior of their circumferential walls will fit snugly over the exterior of the circumferential walls of the respective inner field rings 38 and 40. The bobbins 36 and 44 with the respective windings 34 and 42 thereon fit snugly within the annulus defined by the respective outer and inner field rings.

Preferably, these field rings are formed of a magnetically permeable material, such as CR steel, and are provided with a cadmium plate. The bobbins 36 and 44 are preferably formed of 33% glass-filled nylon.

The axial teeth or pole pieces 48 and 50 of the stator armatures define an axial rotor cavity in which a rotor assembly, described below, is disposed.

The pole pieces 48 and 50 of the front stator armature are staggered relative to the pole pieces 48 and 50 of the rear stator armature. In other words, the front and rear armatures are arranged so that the angular positions of the pole pieces of the front armature are midway between the corresponding positions of the pole pieces of the rear armature. This results in the stator armatures being offset from one another by an electrical angle of 90°. Consequently, in this embodiment each step of the stator motor represents an angle of 7½ mechanical degrees.

The stepper motor further includes a rear bushing 52 which is press-fit into the protuberance 16 of the housing 12. A recess 54 is provided at the front of the rear bushing 52 to mate with a projection (not shown) on a radially inward portion of the rear outer field ring 32.

A front bushing 56 is press fit into the central aperture 24 of the mounting plate 20. A recess 58 in the front bushing mates with a projection (not shown) on the radially inward portion of the front outer field ring 46.

The inner field rings 38 and 40 can either be welded or riveted together. In the latter case, either discrete rivets may be used, or rivets may be extruded out of one ring and flared into a mating hole in the other ring. Two or three rivets and corresponding holes in each ring 38 and 40 will result in an extremely stable assembly.

As mentioned in passing above, a rotor assembly 60 is disposed in a central cavity within the stator armatures. A rear bearing 62 fits within the bushing 52 and a front bearing 64 fits within the bushing 56 to support the rotor assembly for rotation relative to the stator assembly 30.

A rotor core 66, preferably formed of an extruded thermoplastic resin, supports a cylindrical annular rotor magnet 68. The magnet 68 is preferably formed of ferrite and has twenty-four alternating poles: twelve north poles and twelve south poles.

As better seen in FIG. 3, the rotor core 66 is formed as a nut, and has a central axial aperture with female threads 70 disposed therein. The rotor core or nut 66 is preferably constructed of thermoplastic resin having the property of low friction relative to the screw 82. Suitable such resins can include polyfluroethylene, such as Teflon, or a polyethylene resin such as Valox.

An axial rear projection 72 and an axial forward projection 74 fit within the inner races of the bearings 62 and 64, respectively. In order to achieve stepped linear motion, the motor 10 includes a non-rotating axially-movable shaft assembly 80. This assembly 80 includes a screw 82 disposed within the central axial aperture of the core 66 and has helical male threads to mate with the female threads 70 of the core 66. In a preferred embodiment, the screw 82 is of ¼-inch diameter with four lead threads, at five threads per inch with a pitch of 0.200. The screw 82 also has rear and front male mating members 84 and 86.

The shaft assembly further includes a rear shaft 88 having a socket 90 at one end thereof into which the male member 84 is press-fit. A male mating member 92 is formed at the end of the shaft 88 remote from the screw 82, and a bushing 94 is press fit over the male member 92. A helical compression spring 96, preferably formed of music wire and having two closed turns at each end thereof, is disposed between the rear bushing 52 and the bushing 94. Here, the free length of the spring 96 is somewhat greater than the maximum extension of the rear shaft 88, so that the spring exerts a spring force, for example, in the range of four pounds (at maximum forward displacement) to three pounds (at maximum rearward displacement).

The shaft assembly further includes a front shaft 98 having a socket 100 to mate with the male member 86 of the screw 82. A pair of longitudinal grooves 102 are provided in the shaft 100 as a means to check the rotation thereof, as described below.

The front bushing 56 has a sleeve 104 therein surrounding the front shaft 98 to permit free axial movement thereof, at least for a limited extent. Longitudinal grooves 106 are provided in the interior of the sleeve 104, and balls 108 or other spheroids engage with and ride in the grooves 102, 106, and prevent relative tangential displacement or rotation thereof.

It is noted that in the illustrated embodiment, the longitudinal grooves 106 stop short of the very front of the sleeve 104 and the grooves 102 stop short of the rear of the front shaft 98. This feature limits the forward axial displacement of the shaft assembly 80.

While the described embodiment utilizes a pair of grooves 102 and 106 on each of the shaft 98 and sleeve 104, respectively, it is observed that any number of corresponding such features could be used. Furthermore, although the balls 108 are used herein to ride in the grooves 102 and 106, other equivalent structure, such as rollers or the like, could be used instead.

The operation of the above described embodiment can be easily explained as follows.

Positive or negative current is applied, as appropriate, to each of the front and rear stator coils 42 and 34. Consequently, the salient pole pieces 48 and 50 each have a given north or south polarity as determined by the sense of the respective stator current. By changing the direction of the currents to the stator coils 42 and 34, the rotor assembly 60 can be stepped clockwise or counterclockwise as desired. The operation thus far is similar to that described in the patents mentioned above, and is well understood by those skilled in the art.

The stepped rotation of the stator assembly 60 causes the screw 82 to be advanced or withdrawn in minute, but finite steps. In the described embodiment, the shaft assembly moves in steps of 0.002–0.004 inches.

Initially, the shaft assembly 80 is in its withdrawn position, with the rear shaft 88 extended by the spring 96 to its maximum rearward position. The rotations of the rotor assembly 60 acts to move the shaft assembly 80 forward, although later adjustments may require turning the rotor assembly 60 in the opposite direction to withdraw the shaft assembly 80 somewhat.

When power is removed from both the stator coils 34 and 42, for example, if an ignition switch is shut off, then the salient poles 48 and 50 of the stator armatures are no longer magnetized. Consequently, the rotor assembly is free to turn. The force of the compression spring 96 against the bushing 94 tends to pull the rear shaft 88 and the screw 82 rearwards. This force is enough to cause the rotor core 66 to rotate, and this rotation continues until the rear shaft 88 is fully moved to the withdrawn, or zero position.

For this reason, it should be observed that the particular threading selected for the female threads 70 and the screw 82 should be low enough to permit rotation of the rotor assembly 60 to advance the shaft assembly 80, but high enough to permit force of the compression spring 96 to return the front shaft 98 to its withdrawn position when no current is applied to the stator windings 34 and 40.

In fact, the inventors hereof have discovered that a linear stepper motor having the construction described above will reliably return to its zero, or withdrawn position whenever power is cut off, and thereby constitutes an eminently acceptable stepper motor for use in automotive applications.

Figure 6:
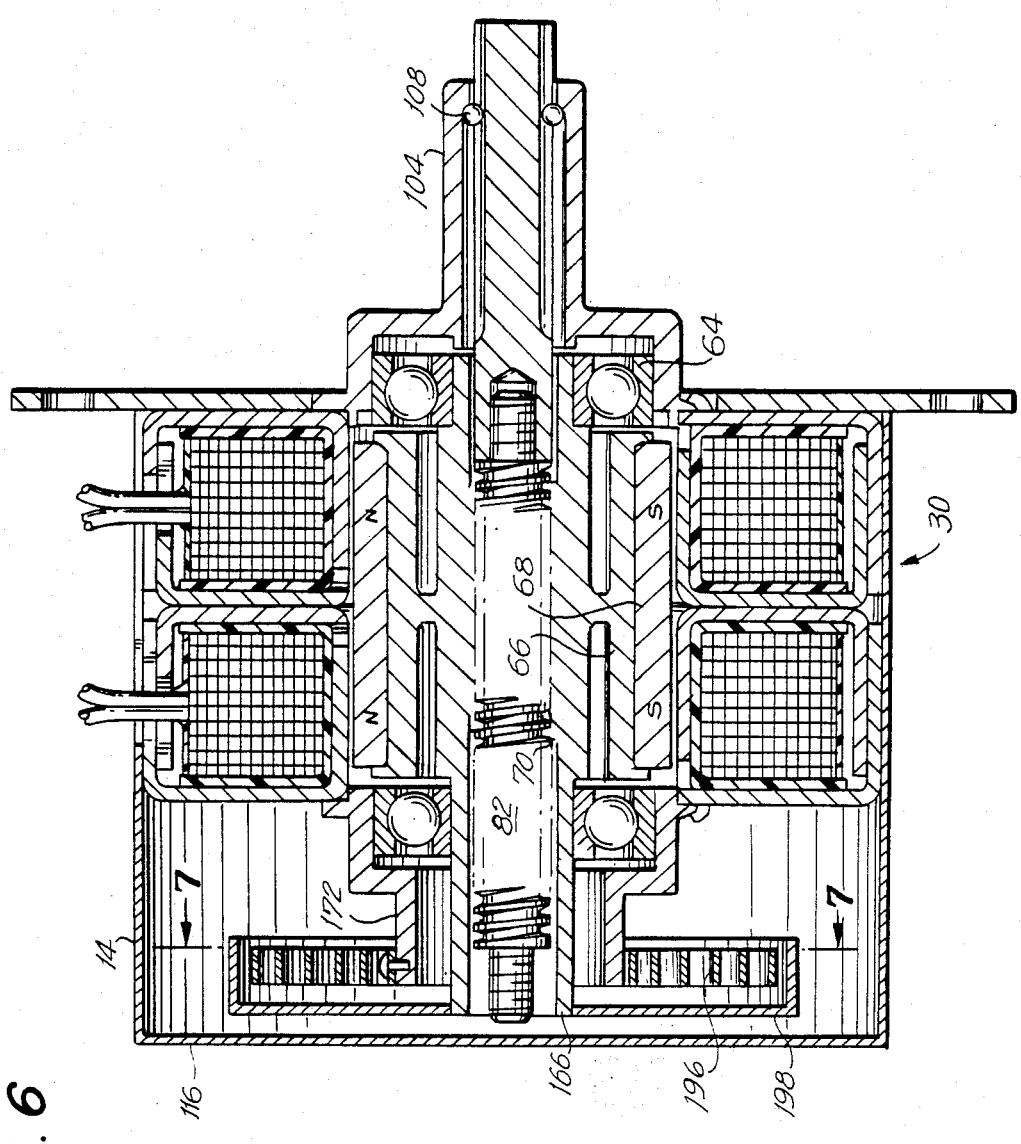
FIG. 6 is a longitudinal view, similar to that of FIG. 3, showing the detail of an alternative embodiment of a return-to-zero stepper motor according to this invention.
Figure 7:
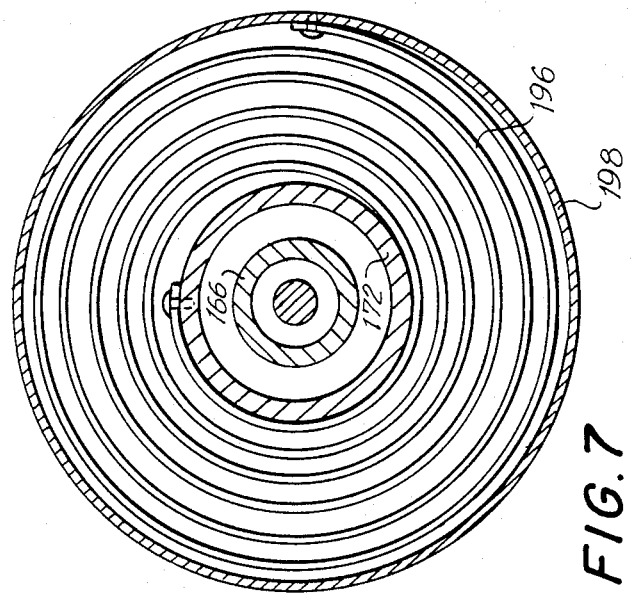
FIG. 7 shows a spiral clock spring used in the embodiment of FIG. 6.

One of many possible alternative embodiments will now be described briefly with reference to FIG. 6. Elements shown in FIG. 6 which are also common to the foregoing embodiment are identified with the same reference characters, and a detailed description thereof is omitted. In this embodiment, a spiral clock spring 196, or other tortional spiral spring is used in place of the compression spring 96. As shown in FIG. 7, the spiral clock spring 196 is generally planar, with radially inner and outer ends. Here a rearward end 166 of the nut or core 66 is extended and has attached thereto a dish 198 containing the spring 196, and fastened thereto at its radially outer end, for example, by means of a rivet. The spiral rear bushing has an extension 172 one end of which abuts the stator assembly 30, and is projecting to a point in advance of the dish 198, and the inner end of the spring 196 is fastened thereto. The clock spring 196 provides means for accomplishing the return to zero function. In this case, since the coil spring 96 and the associated rear shaft are unnecessary, a flat rear wall 116 can be provided on the housing cup 14, thereby shortening the physical size of the motor. The inner end of the spring 196 is connected to the extension 172, whereas the outer end of the spring 196 is connected to the dish 198, which, in turn, is connected to the rearward end 166 of the rotor core 66.

Also, while for most purposes the shaft assembly portions 88, 82, and 98 can be simply press-fit together, in very high thrust applications, these members can also be cross-pinned.

With the stepper motor as described according to the foregoing embodiments, the stator and rotor assemblies 30 and 60 achieve stepping and holding forces of at least ten pounds, and the compression spring force of three to four pounds is sufficient to achieve the return function. Of course, in the case of the clock spring 196 in FIGS. 6 and 7, it should be recognized that a weaker spring could be used, but that such spring would need to be able to provide adequate spring torsion over a range of at least a half-dozen complete rotations.

The above described linear stepper motors are capable of satisfactory operation at stepping rates of zero to three hundred steps per second.

Also, while the above embodiments have a zero, or neutral position of the shaft assembly 80 at a withdrawn position, it is possible to construct a stepper motor according to this invention with a centrally-disposed neutral position partway between the extreme extended and withdrawn positions.

Still further variations and modifications of the above-described embodiments will be apparent to persons skilled in the art, without departing from the scope and spirit of this invention, which is to be ascertained from the appended claims.

I claim:

1. A stepper motor comprising a stator assembly having first and second toroidal stator electromagnets each having a plurality 2n of evenly spaced axial teeth forming alternating salient stator poles, the stator poles of the first and second stator electromagnets being offset from one another by an electrical angle of 90°; a permanent-magnet rotor having a rotor magnet with a plurality n of pairs of poles thereon arranged to face said stator poles, a rotor core supporting said rotor magnet and having a threaded central axial aperture, and bearing means mounting said rotor core for rotation relative to said stator electromagnets; an axially movable shaft assembly including a threaded screw disposed in said axial aperture and adapted to mate therewith, and engaging means engaging a longitudinal track on said shaft assembly for preventing relative rotation of said screw and said rotor assembly while permitting axial movement of said screw, at least to a limited extent; and means urging said screw to a zero axial position thereof whenever no current is applied to said stator electromagnet wherein the central axial aperture of the core and the threaded screw have a thread pitch selected to be low enough to permit rotation of said rotor to advance said shaft assembly when stepping current is applied to said stator electromagnets, but steep enough to permit force of said urging means to return said shaft assembly to said zero axial position when no current is applied to said electromagnets.

2. A stepper motor comprising a stator assembly having a plurality of toroidal stator electromagnets each having a plurality 2n of evenly-spaced axial teeth forming alternating salient poles at a radially internal surface thereof, the stator poles of each of the stator electromagnets being offset from the stator poles of the remaining one or more stator electromagnets; a permanent-magnet rotor including a rotor magnet having a plurality n of pairs of poles thereon and disposed within said stator electromagnets to face said stator poles, a rotor core supporting said rotor magnet and having a threaded central axial aperture, and bearing means mounting said rotor core for rotation relative to said stator electromagnets; an axially movable shaft assembly including a threaded screw disposed in said threaded axial aperture and adapted to mate therewith, and engaging means engaging a longitudinal track on said axially movable shaft for preventing relative rotation of said screw and said stator assembly while permitting axial movement of said screw, at least to a limited extent; and spring means urging said screw to return to a neutral axial position thereof whenever no current is applied to said stator electromagnets wherein the central axial aperture of said rotor core and said threaded screw have a thread pitch selected to be low enough to permit rotation of said rotor to advance said shaft assembly when stepping current is applied to said stator electromagnets, but steep enough to permit force of said spring means to return said shaft assembly to its neutral position when no current is applied to said electromagnets.

3. A stepper motor according to claim 2 wherein said spring means includes a helical compression spring disposed coaxially over a portion of said axially movable shaft assembly.

4. A stepper motor comprising a stator assembly having a plurality of toroidal stator electromagnets each having a plurality 2n of evenly-spaced axial teeth forming alternating salient poles at a radially internal surface thereof, the stator poles of each of the stator electromagnets being offset from the stator poles of the remaining one or more stator electromagnets; a permanent-magnet rotor including a rotor magnet having a plurality n of pairs of poles thereon and disposed within said stator electromagnets to face said stator poles, a rotor core supporting said rotor magnet and having a threaded central axial aperture, and bearing means mounting said rotor core for rotation relative to said stator electromagnets; an axially movable shaft assembly including a threaded screw disposed in said threaded axial aperture and adapted to mate therewith, and means preventing relative rotation of said screw and said stator assembly while permitting axial movement of said screw, at least to a limited extent; and spring means urging said screw to return to a neutral axial position thereof whenever no current is applied to said stator electromagnet, wherein said spring means includes a spiral spring relatively disposed with one end coupled to said stator assembly and another end coupled to said rotor.

5. A stepper motor according to claim 4, wherein the central axial aperture of said rotor core and said threaded screw have a thread pitch selected to be low enough to permit rotation of said rotor to advance said shaft assembly when stepping current is applied to said stator electromagnets, but steep enough to permit force of said spring means to return said shaft assembly to its neutral position when no current is applied to said electromagnets.

6. A stepper motor comprising
stator assembly means including at least one electromagnet and a plurality of axial salient poles disposed about a central cavity thereof;
rotor assembly means including a cylindrical rotor magnet having a plurality of alternating magnetic poles arranged circumferentially thereon, a rotor core supporting said rotor magnet within the cavity of said stator assembly means and having an axial aperture extending centrally therethrough with female helical threads therein, and bearing means supporting axial ends of said rotor core relative to said stator assembly means to permit relative rotation thereof;
a linearly movable shaft assembly including a screw having male threads thereon to mate with said female threads and disposed within said axial aperture of said rotor core, a front shaft coaxial with, and affixed to one end of, said screw, a front sleeve affixed relative to said stator assembly means and radially surrounding said front shaft for permitting axial motion of said front shaft and including engaging means engaging an axial track on said front shaft for restricting rotation thereof, a rear shaft coaxial with, and affixed to another end of, said screw, and a rear sleeve fixedly mounted relative to said stator magnets surrounding said shaft and permitting free axial movement thereof; and
a coil compression spring mounted against said rear sleeve over said rear shaft biasing said shaft assembly rearward;
said threads having a pitch selected to be low enough to permit rotation of said rotor to advance said shaft assembly when stepping current is applied to said stator electromagnet, but high enough to permit force of said compression spring to return said front shaft to a withdrawn position if no current is applied to said stator electromagnet.

7. A stepper motor comprising
stator assembly means including at least one electromagnet and a plurality of axial salient poles disposed about a central cavity thereof;
rotor assembly means including a cylindrical rotor magnet having a plurality of alternating magnetic poles arranged circumferentially thereon, a rotor core supporting said rotor magnet within the cavity of said stator assembly means and having an axial aperture extending centrally therethrough with female helical threads therein, and bearing means supporting axial ends of said rotor core relative to said stator field magnets to permit relative rotation thereof;

a linearly movable shaft assembly including a screw having male threads thereon to mate with said female threads and disposed within said axial aperture of said rotor core, a front shaft coaxial with, and affixed to one end of, said screw, a front sleeve affixed relative to said stator field coils and radially surrounding said front shaft said front sleeve including engaging means engaging a longitudinal track on said front shaft for permitting axial motion of said front shaft while restricting rotation thereof, said shaft and said sleeve having a corresponding at least one axial groove therein and one or more spheroids disposed within said corresponding grooves to permit said axial movement but to restrict said rotation;

and a coil spring mounted over a portion of said shaft assembly to urge the latter towards a neutral axial position;

said threads having a pitch selected to be low enough to permit rotation of said rotor to advance said shaft assembly when stepping current is applied to said at least one electromagnet, but high enough to permit force of said compression spring to return said front shaft to said neutral position if no current is applied to said electromagnet.

8. A stepper motor comprising stator assembly means including at least one electromagnet a plurality of axial salient poles disposed therein about a central cavity thereof; rotor assembly means including a cylindrical rotor magnet having a plurality of magnetic poles arranged circumferentially thereon, a rotor core supporting said rotor magnet within the cavity of said stator assembly means and having an axial aperture extending centrally therethrough with female helical threads therein, and bearings supporting axial ends of said rotor core relative to said stator field magnets to permit relative rotation thereof; a linearly movable shaft assembly including a screw having male threads thereon to mate with said female threads and disposed within said axial aperture of said rotor core, a front shaft coaxial with, and affixed to one end of, said screw, a front sleeve affixed relative to said stator field coils and radially surrounding said front shaft for permitting axial motion of said front shaft while restricting rotation thereof, each of said shaft and said sleeve having corresponding pair of diametrically opposed axial grooves therein, and one or more spheroids disposed within said corresponding grooves to permit said axial movement but to restrict said rotation; and resilient means disposed to bias said shaft assembly towards a neutral position thereof so that when no current is applied to said at least one electromagnet, said linearly movable shaft assembly is returned to its neutral axial position.

9. A stepper motor according to claim 8, wherein grooves each have at least one end wall to cooperate with the associated spheroid to limit axial movement of said shaft assembly away from said neutral position.

10. A stepper motor comprising a stator assembly including first and second stator field electromagnets arranged axially in tandem, each of said first and second field magnets having mating outer and inner field rings of magnetically permeable material and having an annular radial wall, a cylindrical solid wall, and a plurality n of axial teeth parallel to said solid wall and circumferentially evenly spaced at the cavity of said field magnet, and a toroidal bobbin having a toroidal winding thereon, said outer ring overfitting said inner field ring with said bobbin and winding encased therebetween, and with said teeth forming 2n alternating salient pole pieces; said first and second field magnets being fixedly disposed so that angular positions of the pole pieces of the first field magnet are midway between the corresponding positions of the pole pieces of the second field magnet; a rotor assembly including a cylindrical rotor magnet having a plurality n of magnetic pole pairs arranged circumferentially thereon, a rotor core supporting said rotor magnet, bearing means supporting axial ends of said rotor core relative to said stator field magnets to permit relative rotation thereof, and an axial helical thread disposed on said rotor core; a linear movable assembly including a screw portion having threads thereon to mate with the threads of said rotor core and disposed at the axial position of said rotor core, slide means affixed to one end of said screw portion to move axially therewith and having a front sleeve affixed relative to said stator field coils and including engaging means engaging an axial track on said slide means for permitting axial motion of said slide means while preventing rotation thereof, and a coil compression spring mounted over a portion of said linearly movable assembly to urge the same to a neutral position thereof; said threads having a pitch selected to be low enough to permit rotation of said rotor assembly to advance said linearly movable assembly when stepping current is applied to said stator field magnets, but high enough to permit force of said compression spring to return said slide means to said netural position if no current is applied to said stator field magnets.

11. A stepper motor comprising a stator assembly including first and second field electromagnets arranged axially in tandem and having a stator cavity extending axially therethrough, each of said first and second field magnets having mating outer and inner field rings of magnetically permeable material and having an annular radial wall, a cylindrical outer wall, and a plurality n of axial teeth parallel to said outer wall and circumferentially evenly spaced at the cavity of said field magnet, and a toroidal bobbin having a toroidal winding thereon, said outer field ring overfitting said inner field ring with said bobbin and winding encased therebetween, and with said teeth forming 2n alternating salient pole pieces; said first and second field magnets being fixedly disposed so that angular positions of the pole pieces of the first magnet are 90° of electrical angle from the corresponding positions of the pole pieces of the second field magnet; a rotor assembly including a cylindrical rotor magnet having a plurality n of magnetic pole pairs arranged circumferentially thereon, a rotor core supporting said rotor magnet within the cavity of said field magnets and having an axial aperture extending centrally therethrough with female helical threads therein, and bearings supporting axial ends of said rotor core relative to said stator field magnets to permit relative rotation thereof; and a linearly movable shaft assembly including a screw having male threads thereon to mate with said female threads and disposed within said axial aperture of said rotor core, a front shaft coaxial with, and affixed to one end of, said screw, a front sleeve affixed relative to said stator field coils and radially surrounding said front shaft and including engaging means engaging an axial track on said front shaft for permitting axial motion of said front shaft between a withdrawn position and an extended position while restricting rotation thereof, a rear shaft coaxial with, and affixed to another end of, said screw, a bushing mounted at an end of said rear shaft remote from said screw, a rear sleeve fixedly mounted relative to said stator magnets surrounding said shaft and permitting free axial movement thereof; and a coil compression spring mounted between said bushing and said rear sleeve over said rear shaft; said spring having a free length longer than the distance from said bushing to said rear sleeve when said shaft assembly is in the withdrawn position and being selected to exert a spring force, at all lengths thereof corresponding to positions of the shaft assembly between its extended and its withdrawn positions, of sufficient strength to move said shaft assembly toward its withdrawn position when no current is applied to said stator field electromagnets.

12. A stepper motor comprising a stator assembly including first and second stator field electromagnets arranged axially in tandem and having a stator cavity extending axially therethrough, each of said first and second field magnets having mating outer and inner field rings of magnetically permeable material and having an annular radial wall, a cylindrical outer wall, and a plurality n of axial teeth parallel to said outer wall and circumferentially evenly spaced at the cavity of said field magnet, and a toroidal bobbin having a toroidal winding thereon, said outer field ring overfitting said inner field ring with said bobbin and winding encased therebetween, and with said teeth forming 2n alternating salient pole pieces; said first and second field magnets being fixedly disposed so that angular positions of the pole pieces of the first magnet are midway between the corresponding positions of the pole pieces of the second magnet;

a rotor assembly including a cylindrical rotor magnet having a plurality n of magnetic pole pairs arranged circumferentially thereon, a rotor core supporting said rotor magnet within the cavity of said field magnets and having an axial aperture extending centrally therethrough with female helical threads therein, and bearings supporting axial ends of said rotor core relative to said stator field magnets to permit relative rotation thereof; and a linearly movable shaft assembly including a screw having male threads thereon to mate with said female threads and disposed within said axial aperture of said rotor core, a front shaft coaxial with, and affixed to one end of, said screw, a front sleeve affixed relative to said stator assembly and radially surrounding said front shaft including engaging means engaging an axial track on said front shaft for permitting axial motion of said front shaft while restricting rotation thereof, a rear shaft coaxial with, and affixed to another end of, said screw, a bushing mounted at an end of said rear shaft remote from said screw, a rear sleeve fixedly mounted relative to said stator magnets surrounding said shaft and permitting free axial movement thereof;

a coil compression spring mounted between said bushing and said rear sleeve over said rear shaft; and housing means for said rotor and stator assembly including a casing surrounding said stator assembly and said rear shaft, and a mounting plate affixed to said front sleeve and including means to permit fastening said stepper motor to a device to be driven thereby.

13. A stepper motor according to claim 12, wherein said casing is press fit over a portion of said rear sleeve.

14. A stepper motor according to claim 12, wherein said casing includes a hollow protuberance extending over said rear shaft.

15. A stepper motor comprising a stator assembly including first and second stator field electromagnets arranged axially in tandem and having a stator cavity extending axially therethrough, each of said first and second field magnets having mating outer and inner field rings of magnetically permeable material and having an annular radial wall, a cylindrical outer wall, and a plurality n of axial teeth parallel to said outer wall and circumferentially evenly spaced at the cavity of said field magnet, and a toroidal bobbin having a toroidal winding thereon, said outer field ring overfitting said inner field ring with said bobbin and winding encased therebetween, and with said teeth forming 2n alternating salient pole pieces; said first and second field magnets being fixedly disposed so that angular positions of the pole pieces of the first magnet are midway between the corresponding positions of the pole pieces of the second field magnet;

a rotor assembly including a cylindrical rotor magnet having a plurality n of magnetic pole pairs arranged circumferentially thereon, a rotor core supporting said rotor magnet within the cavity of said field magnets and having an axial aperture extending centrally therethrough with female helical threads therein, and bearings supporting axial ends of said rotor core relative to said stator field magnets to permit relative rotation thereof;

a linearly movable shaft assembly including a screw having male threads thereon to mate with said female threads and disposed within said axial aperture of said rotor core, a front shaft coaxial with, and affixed to one end of, said screw, a front sleeve affixed relative to said stator field coils and radially surrounding said front shaft for permitting axial motion of said front shaft while restricting rotation thereof, said shaft and said sleeve having corresponding axial grooves therein and one or more spheroids disposed within said corresponding grooves to permit said axial movement but to restrict said rotation, a rear shaft coaxial with, and affixed to another end of, said screw, a bushing mounted at an end of said rear shaft remote from said screw, and a rear sleeve fixedly mounted relative to said stator magnetis surrounding said shaft and permitting free axial movement thereof; and a coil compression spring mounted between said bushing and said rear sleeve over said rear shaft;

said threads having a pitch selected to be low enough to permit rotation of said rotor to advance said shaft assembly, but high enough permit force of said compression spring to return said front shaft to a withdrawn position if no current is applied to said stator field magnets.

16. A stepper motor comprising a stator assembly including first and second field electromagnets arranged axially in tandem and having a stator cavity extending axially therethrough, each of said first and second field magnets having mating outer and inner field rings of magnetically permeable material and having an annular radial wall, a cylindrical outer wall, and a plurality n of axial teeth parallel to said outer wall and circumferentially evenly spaced at the cavity of said field magnet, and a toroidal bobbin having a toroidal winding thereon, said outer field ring overfitting said inner field ring with said bobbin and winding encased therebetween, and with said teeth forming 2n alternating salient pole pieces; said first and second field magnets being fixedly disposed so that angular positions of the pole pieces of the first magnet are midway between the corresponding positions of the pole pieces of the second field magnet;

a rotor assembly including a cylindrical rotor magnet having a plurality n of magnetic pole pairs arranged circumferentially thereon, a rotor core supporting said rotor magnet within the cavity of said field magnets and having an axial aperture extending centrally therethrough with female helical threads therein, and bearings supporting axial ends of said rotor core relative to said stator field magnets to permit relative rotation thereof;

a linearly movable shaft assembly including a screw having male threads thereon to mate with said female threads and disposed within said axial aperture of said rotor core, a front shaft coaxial with, and affixed to one end of, said screw, a front sleeve affixed relative to said stator field coils and radially surrounding said front shaft and including means for permitting axial motion of said front shaft while restricting rotation thereof; and a torsion spring arranged to impart a torsional spring force directly onto said rotor assembly relative to said stator assembly and to bias said rotor assembly to rotate and return said screw and front shaft to a withdrawn position thereof whenever no current is applied to said stator electromagnets.

17. A stepper motor comprising a stator assembly including first and second field electromagnets arranged axially in tandem and having a stator cavity extending axially therethrough, each of said first and second field magnets having mating outer and inner field rings of magnetically permeable material and having an annular radial wall, a cylindrical outer wall, and a plurality n of axial teeth parallel to said outer wall and circumferentially evenly spaced at the cavity of said field magnet, and a toroidal bobbin having a toroidal winding thereon, said outer field ring overfitting said inner field ring with said bobbin and winding encased therebetween, and with said teeth forming 2n alternating salient pole pieces; said first and second field magnets being fixedly disposed so that angular positions of the pole pieces of the first magnet are midway between the corresponding positions of the pole pieces of the second field magnet;

a rotor assembly including a cylindrical rotor magnet having a plurality n of magnetic pole pairs arranged circumferentially thereon, a rotor core supporting said rotor magnet within the cavity of said field magnets and having an axial aperture extending centrally therethrough with female helical threads therein, and bearings supporting axial ends of said rotor core relative to said stator field magnets to permit relative rotation thereof;

a linearly movable shaft assembly including a screw having male threads thereon to mate with said female threads and disposed within said axial aperture of said rotor core, a front shaft coaxial with, and affixed to one end of, said screw, a front sleeve affixed relative to said stator field coils and radially surrounding said front shaft and including means for permitting axial motion of said front shaft while restricting rotation thereof; and a torsion spring arranged to impart a torsional spring force directly onto said rotor assembly relative to said stator assembly and to bias said rotor assembly to rotate and return said screw and front shaft to a withdrawn position thereof whenever no current is applied to said stator electromagnets, wherein said torsion spring is a spiral clock spring.

18. A stepper motor comprising a stator assembly including first and second stator field electromagnets arranged axially in tandem and having a stator cavity extending axially therethrough, each of said first and second field magnets having mating outer and inner field rings of magnetically permeable material and having an annular radial wall, a cylindrical outer wall, and twelve axial teeth parallel to said outer wall and circumferentially evenly spaced at the cavity of said field magnet, and a toroidal bobbin having a toroidal winding thereon, said outer field ring overfitting said inner field ring with said bobbin and winding encased therebetween, and with said teeth forming twenty-four alternating salient pole pieces; said first and second filed magnets being fixedly disposed so that angular positions of the pole pieces of the first magnet are offset at 90° of electrical angle relative to corresponding positions of the pole pieces of the second magnet;

a rotor assembly including a cylindrical rotor magnet having twelve magnetic pole pairs arranged circumferentially thereon, a rotor core supporting said rotor magnet within the cavity of said field magnets and having an axial aperture extending centrally therethrough with female helical threads therein, and bearings supporting axial ends of said rotor core relative to said stator field magnets to permit relative rotation thereof; and a linearly movable shaft assembly including a screw having male threads thereon to mate with said female threads and disposed within said axial aperture of said rotor core, a front shaft coaxial with, and affixed to one end of, said screw, a front sleeve affixed relative to said stator field coils and radially surrounding said front shaft and including engaging means means for engaging an axial groove on said front shaft and permitting axial motion of said front shaft while restricting rotation thereof, and a rear shaft coaxial with, and affixed to another end of, said screw, a bushing mounted at an end of said rear shaft remote from said screw, a rear sleeve fixedly mounted relative to said stator magnets surrounding said shaft and permitting free axial movement thereof; and a coil compression spring mounted between said bushing and said rear sleeve over said rear shaft to return said front shaft to a withdrawn position if no current is applied to said stator field magnets; wherein said male threads and female threads have a pitch selected to be low enough to permit rotation of said rotor to advance said shaft assembly when stepping current is applied to said stator field magnets, but steep enough to permit force of said coil compression spring to return said front shaft to its withdrawn position when no current is applied to said stator field magnets.

19. A stepper motor according to claim 18, wherein said screw and mating female threads are provided at 0.200 pitch, 4 leads.

20. A stepper motor according to claim 18 or 19, wherein said compression spring provides 3–5 pounds of spring force between said withdrawn position and a fully extended position of said shaft assembly.

21. A stepper motor comprising a stator assembly including electromagnet means having at least one electromagnet and a plurality of salient stator poles disposed about a central cavity thereof;

rotor assembly means including a hollow cylindrical rotor magnet having a plurality of alternating magnetic poles arranged circumferentially thereon, a rotor core formed of a nut of thermoplastic resin for supporting said rotor magnet within the cavity of said stator assembly means and having an axial aperture extending centrally therethrough with female helical threads therein, and bearing means supporting axial ends of said rotor core relative to said stator assembly means to permit relative rotation thereof;

a linearly movable shaft assembly including a screw having male threads thereon to mate with said female threads and disposed within said axial aperture of said rotor core, a front shaft coaxial with, and affixed to one end of, said screw and having an axial track, a front sleeve affixed relative to said stator assembly means and radially surrounding said front shaft for permitting axial motion of said front shaft and including means engaging said axial track on said front shaft for preventing rotation thereof; and resilient means urging said rotor assembly means to rotate to an initial position and said shaft assembly to move to a withdrawn position whenever no current is applied to the electromagnet of the stator assembly means;

said thermoplastic resin having the property of low friction relative to said screw.

22. A stepper motor according to claim 21, wherein said thermoplastic resin includes polyfluoroethylene.

23. A stepper motor according to claim 21 wherein said thermoplastic resin includes Valox TM.

24. A stepper motor comprising
a stator assembly including first and second stator field electromagnets arranged axially in tandem and having a stator cavity extending axially therethrough, each of said first and second field magnets having mating outer and inner field rings of magnetically permeable material and having an annular radial wall, a cylindrical outer wall, and a plurality n of axial teeth parallel to said outer wall and circumferentially evenly spaced at the cavity of said field magnet, and a toroidal bobbin having a toroidal winding thereon, said outer field ring overfitting said inner field ring with said bobbin and winding encased therebetween, and with said teeth forming 2n alternating salient pole pieces; said first and second field magnets being fixedly disposed so that angular positions of the pole pieces of the first magnet are midway between the corresponding positions of the pole pieces of the second magnet;

a rotor assembly including a cylindrical rotor magnet having a plurality n of magnetic pole pairs arranged circumferentially thereon, a rotor core supporting said rotor magnet within the cavity of said field magnets and having an axial aperture extending centrally therethrough with female helical threads therein, and bearings supporting axial ends of said rotor core relative to said stator field magnets to permit relative rotation thereof;

a linearly movable shaft assembly including a screw having male threads thereon to mate with said female threads and disposed within said axial aperture of said rotor core, a front shaft coaxial with and affixed to one end of said screw, a front sleeve affixed relative to said stator assembly and radially surrounding said front shaft including engaging means engaging an axial track in said front shaft for permitting axial motion of said front shaft relative to said sleeve while restricting rotation thereof, a rear shaft coaxial with, and affixed to another end of, said screw, a bushing mounted at an end of said rear shaft remote from said screw, a rear sleeve fixedly mounted relative to said stator magnets surrounding said shaft and permitting free axial movement thereof; and housing means for said rotor and stator assembly including a casing surrounding said stator assembly and said rear shaft, and a mounting plate affixed to said front sleeve and including means to permit fastening said stepper motor to a device to be driven thereby.

25. A stepper motor comprising a stator assembly including stator electromagnet means having at least one electromagnet and a plurality of salient stator poles disposed about a central cavity thereof;

rotor assembly means including a hollow cylindrical rotor magnet having a plurality of alternating magnetic poles arranged circumferentially thereon, a rotor core formed of a nut of thermoplastic resin for supporting said rotor magnet within the cavity of said stator assembly means and having an axial aperture extending centrally therethrough with female helical threads therein, and bearing means supporting axial ends of said rotor core relative to said stator assembly means to permit relative rotation thereof; and a linearly movable shaft assembly including a screw having male threads thereon to mate with said female threads and disposed within said axial aperture of said rotor core, a front shaft coaxial with, and affixed to one end of, said screw, a front sleeve affixed relative to said stator assembly means and radially surrounding said front shaft and including engaging means for engaging axial track on said front shaft for permitting axial motion of said front shaft relative to said sleeve while preventing rotation of said front shaft;

said thermoplastic resin having the property of low friction relative to said screw.

* * * * *